①

②

③

④

United States Patent Office 3,484,615
Patented Dec. 16, 1969

3,484,615
PHOTOELECTRIC AREA MEASURING APPARATUS FOR IRREGULAR-SHAPED PLANE OBJECTS UTILIZING DIGITAL TECHNIQUES
Hiromitsu Noro and Hisae Kashikura, Tokyo, Japan, assignors to Hayashi Denko Kabushiki-Kaisha, Tokyo, Japan
Filed May 13, 1968, Ser. No. 728,705
Claims priority, application Japan, May 12, 1967, 42/29,744
Int. Cl. G01b 11/04
U.S. Cl. 250—219
10 Claims

ABSTRACT OF THE DISCLOSURE

An automatic apparatus for measuring the areas of irregularly shaped plane objects comprises a light source and a reflector shaped so as to produce a thin curved screen of parallel light rays. A transparent belt for conveying objects to be measured is disposed to move the objects through the light screen and a rotating plate having at least one radial slit is disposed beneath the transparent belt. The rotating slit intersecting the light screen to provide an aperture which travels across the belt. A reflector is disposed to collect the light which passes through the moving aperture 14 onto a photo-electric transducer. Motor means which drive the belt and the rotating disc in timed relationship are also disposed to drive an electrical pulse generator. An electrical counter and circuit connections between the pulse generator, the photo-electric transducer and the counter are provided for the purpose of counting pulses during passage of the radial slit along the portion of the light screen that is obscured by the introduction of a plane object on the transparent belt. The total of pulses counted during passage of the object through the light screen gives an indication of its area.

---

The invention relates in general to area measuring apparatus and more specifically to a digital type of apparatus which measures the area of irregular plane objects and displays directly the results of the measurement.

Various proposals have been made for measuring the area of a plane body by applying beams of light to the body. Apparatus according to these proposals have been unsatisfactory in measuring accuracy and have a restriction that the object to be measured must be perfectly opaque. In addition, it has been impossible with the conventional apparatus to measure plural objects in succession almost instantaneously.

An object of this invention is to provide an automatic area measuring apparatus capable of measuring an irregular plane body with a high degree of accuracy.

Another object of this invention is to provide an automatic area measuring apparatus capable of measuring opaque and translucent objects with the same accuracy.

Another object of this invention is to provide an automatic area measuring apparatus in which an object to be measured is subjected to no limit in length because it may be fed into the apparatus continuously and the measured values are integrated.

Figure 1:
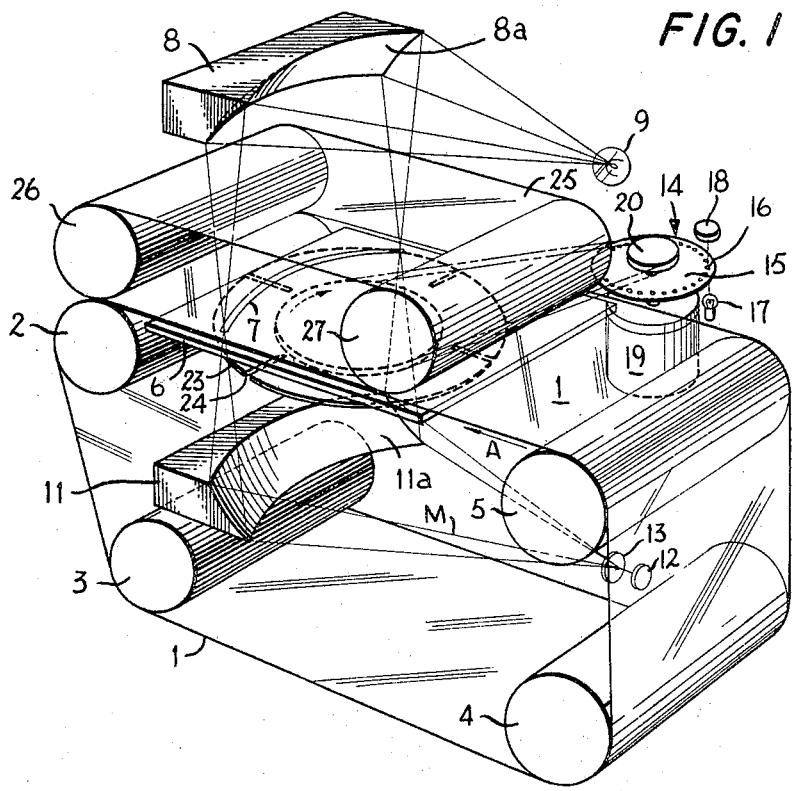
Figure 2:
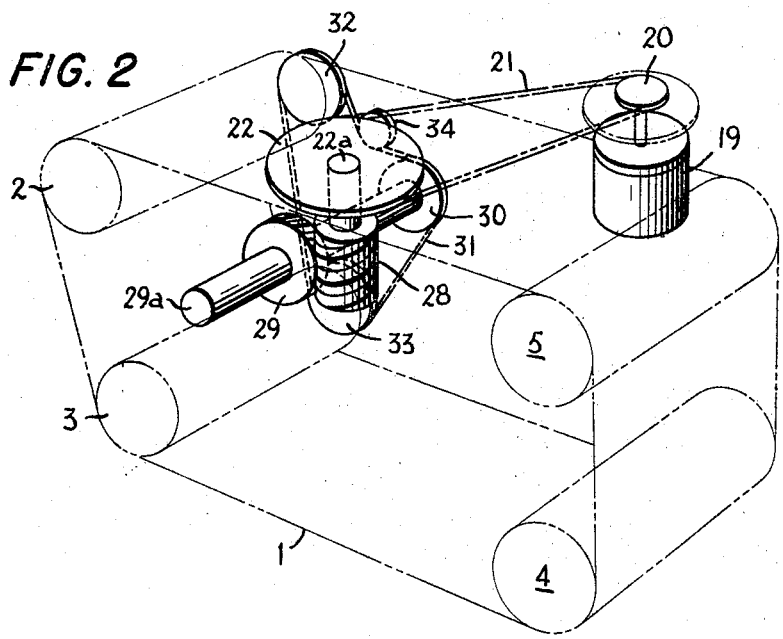
Figure 3:
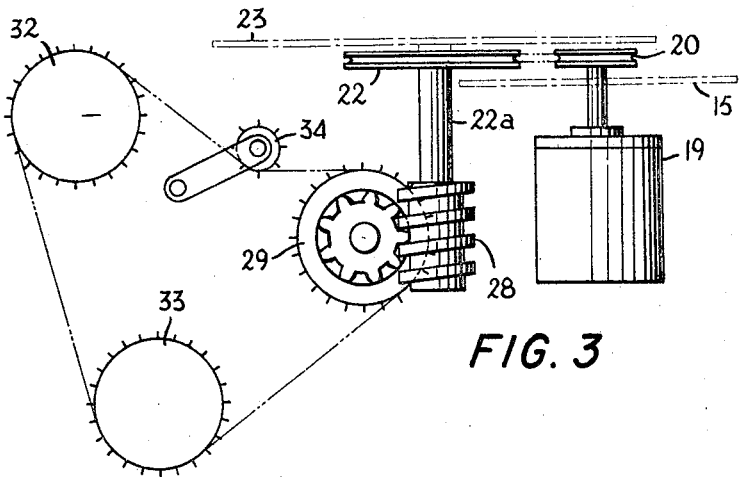
Figure 4:
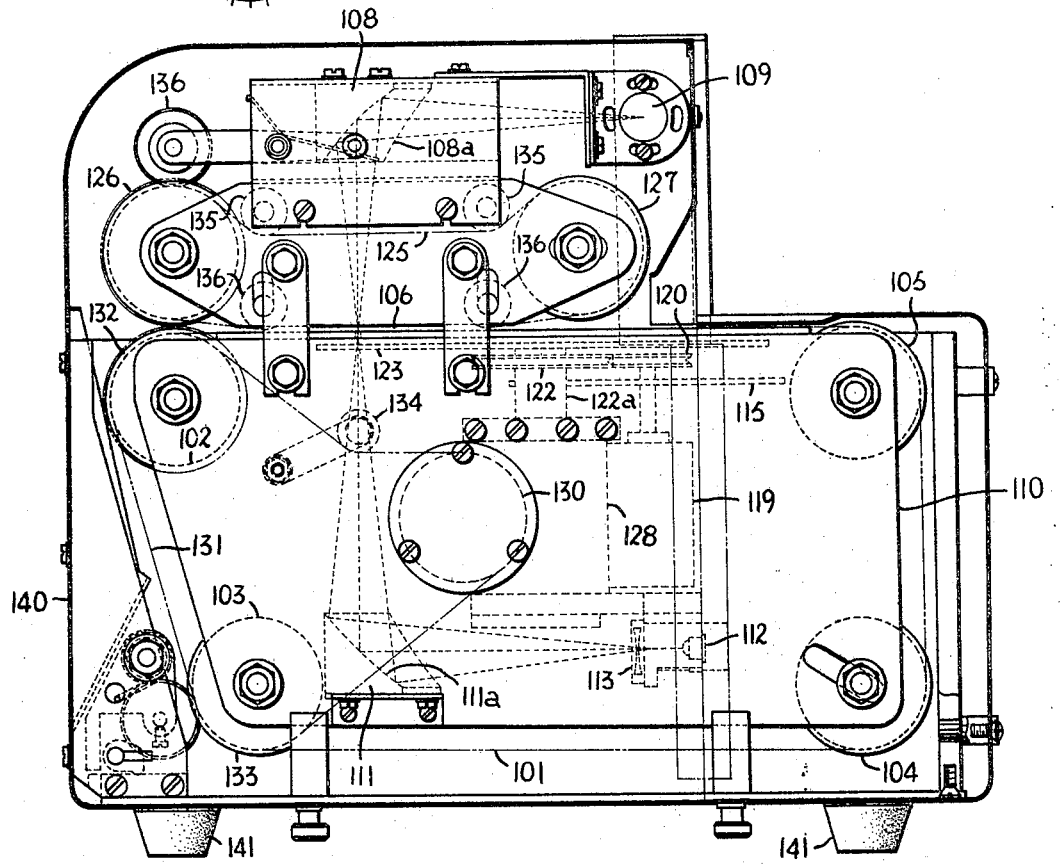
Figure 5:
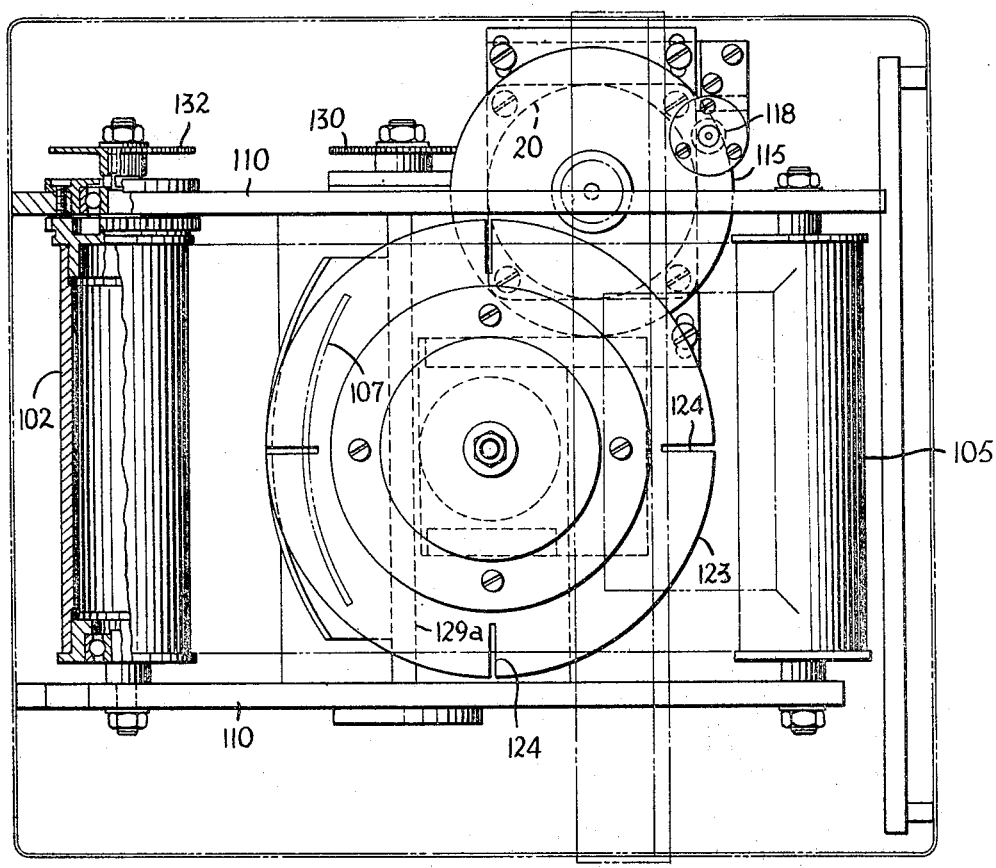
Figure 6:
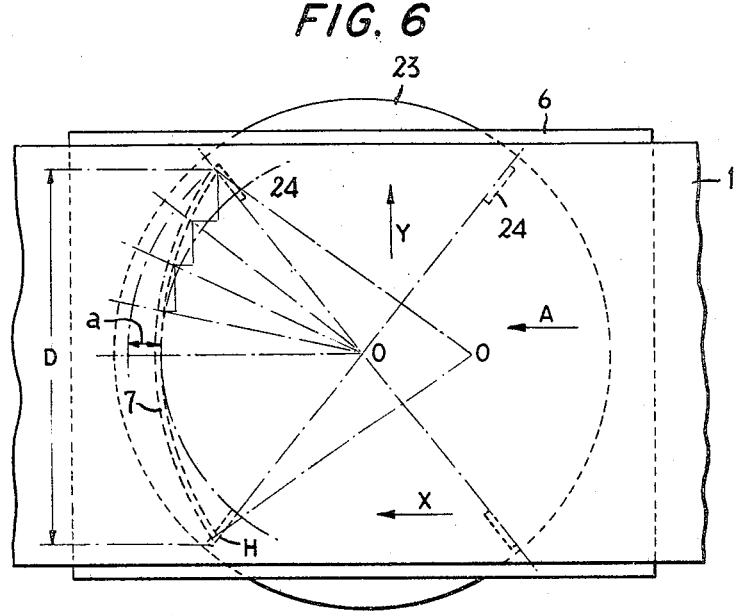
Figure 7:
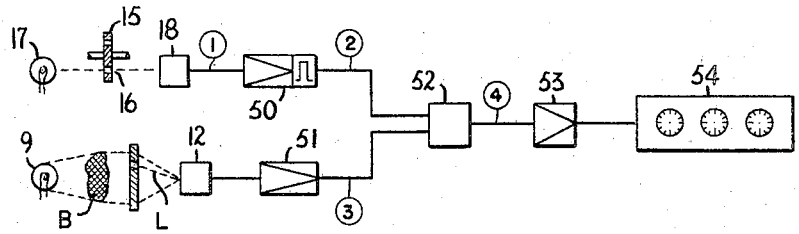

Other objects and a fuller understanding of the invention may be had by referring to the following description and claims, taken in conjunction with the accompanying drawing, in which:

FIG. 1 is a schematic perspective view of apparatus in accordance with the invention, FIG. 2 is a partial schematic perspective view showing a transparent belt, supporting rollers and driving mechanism, FIG. 3 is a schematic side view of driving mechanism, FIG. 4 is a side view of a constructional embodiment of the invention, FIG. 5 is a plan view of the apparatus shown in FIG. 4 with the upper portion of the apparatus removed, FIG. 6 is a schematic plan illustrating the relation of parts of the apparatus, FIG. 7 is a block circuit diagram of the electrical and optical system of the apparatus, and FIGS. 8, 9, 10 and 11 representations of the electrical signal present at locations 1, 2, 3 and 4 respectfully in FIG. 7.

In the apparatus shown by way of example in FIGS. 1 to 3 of the drawings, a transparent belt 1 for conveying an object to be measured (hereinafter referred to as a specimen) runs over rolls 2, 3, 4 and 5. An opaque plate 6 is disposed immediately under the upper horizontal run of the belt between rollers 2 and 5. The plate 6 has a transversely extending arcuate slit 7 having its center of curvature disposed at O' (FIG. 6). An optical system for projecting a beam of light through the slit 7 is shown as comprising a reflector 8 positioned above the upper horizontal run of the belt and having a curved face 8a receiving light emanating from a point source 9 and directing and focusing the light into a thin and arcuate screen of parallel rays coinciding with the slit 7. A condensing reflector 11 positioned below the upper horizontal run of the belt has a curved face 11a identical to the curved face 8a to collect light passing through the slit 7 and direct it to a light receiver 12 comprising a suitable photosensitive element, for example, a photocell or photodiode. A condenser lens 13 improves the sensitivity of the light receiver 12.

The reflectors 8 and 11 are located just above and just under the arcuate slit 7 respectively and the positions of the light source 9 and the light receiver 12 coincide with the center of curvature O' of the arcuate slit 7. Thus the reflecting faces of the reflectors are so designed that their horizontal focal distance is equal to the radial distance from the arcuate slit 7 to the center of curvature O'.

Means for driving the belt 1 at a selected speed is shown as comprising a motor 19 having pulley or sprocket 20 driving a larger pulley or sprocket 22 by means of a belt or chain 21. The driven pulley 22 is fixed on a shaft 22a on which is fixed a worm 28 driving a worm wheel 29 fixed on a transverse shaft 29a. A pulley or sprocket 30 fixed on shaft 29a drives pulleys or sprockets 32 and 33 on rolls 2 and 3 respectively through a belt or chain 31 which is maintained under proper tension by an idler 34. The pulley or sprocket 22 carries a rotary disc 23 disposed just below the plate 6 and provided with three or more radial slits 24 adjacent its circumference. The distance between successive slits 24 corresponds to the length of the arcuate slit 7 in plate 6. As seen in FIG. 6, the center of rotation of the disc 23 is located at O which is between the arcuate slit 7 and the center of curvature O' of the arcuate slit. The slits 24 are of sufficient radial extent so that they intersect the arcuate slit 7 during their travel from one end of the arcuate slit to the other. As the radial slits 24 successively scan the length of the arcuate slit 7, light reflected by the curved surface 8a passes through the gap H formed by the intersecting portions of the arcuate slit and a radial slit and is received by the curved surface 11a of the reflector 11 which directs it through the condensing lens 13 to the light receiver 12. However, when a specimen overlies a portion of the arcuate slit 7, the passage of light through that portion of the arcuate slit will be obstructed or attenuated by the specimen.

The arcuate slit 7 in the plate 6 is of such form that the maximum width D that can be measured may be as large as possible compared with the diameter of the rotary slitted disc 23 and that the amount of travel in the Y direction of the gap H traveling along the arcuate slit may be as uniform as possible. Consequently, the length of the slits in disc 23 must be more than the maximum difference 1 of the distances between the arcuate slit and the center O of rotation of the disc 23.

An upper transparent belt 25 driven by rolls 26 and 27 holds the specimen flat on the upper horizontal run of the main transparent belt 1. The roll 26 is driven by frictional contact with the roll 2 or by suitable gears or friction discs provided on the respective rolls.

Figure 8:
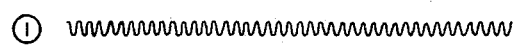
Figure 9:
Figure 10:
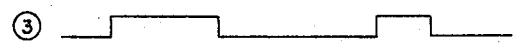
Figure 11:
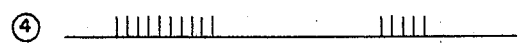

As illustrated diagrammatically in FIGS. 1 and 7, the optical-electrical system of the apparatus comprises means for generating electrical pulses in predetermined timed relationship with the transport of the specimen by the transparent belt 1. The pulse generator 14 is shown as comprising a perforate disc 15 fixed on the shaft of the motor 19 (FIG. 1) and provided near its periphery with a series of holes 16. Light from a miniature lamp 17 is optically directed through the holes 16, as the disc 15 rotates, onto photoelectric element 18 to produce a series of rapidly recurring pulses as illustrated in FIG. 8. The pulses are amplified and shaped by a wave form regulating amplifier 50 to provide a series of sharp pulses as illustrated in FIG. 9. The pulses are applied to a gate circuit 52 which is controlled by a signal from the light receiver 12 amplified by a signal amplifier 51 to provide a gating signal as illustrated in FIG. 10 according to whether or not the light from light source 9 passing through the gap H defined by the intersecting slits 7 and 24 is intercepted by a specimen overlying a portion of the arcuate slit 7. When the gate 52 is open, pulses from the pulse generator are permitted to pass as illustrated in FIG. 11. The pulses are amplified by an amplifier 53 and are counted by a digital counter 54.

The operation of the apparatus in accordance with the invention is as follows. When the apparatus is turned on and a specimen B is supplied to the inlet, it is transported by the transparent belt 1 in the direction of the arrow A toward the light screen passing through the arcuate slit 7. The light screen is provided by light from the point source 9 reflected by the reflector surface 8a so as to be directed as parallel beams passing through the arcuate slit 7 to the reflector surface 11a. The light L is thereupon reflected along the line M from the condensing reflector surface 11a through the lens 13 to the light receiver 12 which controls the gate 52. The rotating slits 24 move with a uniform circular motion and overlap the arcuate slit 7 continuously throughout its entire length. Hence in the absence of a specimen, light is received continuously by the light receiver 12 and the gate 52 is accordingly kept closed so that no pulses are counted.

When the specimen B reaches the arcuate slit 7, a part of the light screen passing through the slit is intercepted by the specimen and hence the light L cannot pass through the gap H during its travel along that portion of the arcuate slit which corresponds to the portion of the light screen intercepted by the specimen. Light to the light receiver 12 is thereby interrupted and accordingly the gate 52 is opened during that interval of time which is required for the gap H to travel along that portion of the arcuate slit which the specimen overlies. This operation of the gate is illustrated in FIG. 10.

During the time the gate 52 is open, pulses supplied by the pulse generator 14 comprising the light source 17, rotating perforate disc 15 and photoelectric element 18 are fed to the digital counter 54 as illustrated in FIG. 11. Hence the number of pulses counted during each passage of the gap H from one end to the other of the arcuate slit 7 corresponds to the portion of the slit that the specimen at that time overlies.

The operation continues until the entire specimen has passed through the light screen provided by the light source 9 and the reflecting surface 8a. The counting of pulses during successive passes of the gap H across the width of the belt is cumulative and hence the total number of pulses counted during the passage of a specimen through the apparatus corresponds to the area of the specimen. The counter is conveniently calibrated in accordance with the parameters of the apparatus so as to read directly in units of area.

EXAMPLES

The capabilities and accuracy of apparatus in accordance with the present invention are illustrated by the following data taken with apparatus in which the width D is 100 mm., the width of the arcuate slit 7 and the radial slits 24 is 1 mm., the traveling speed of the specimen is 3000 mm. per minute and the minimum area measured is 4 mm.$^2$.

In order to examine the influence on the measurement of different shapes and sizes of specimens, sheets of section paper differing in shape and size and of known area were combined in such a way that their total area was 200 cm.$^2$. Table 1 shows the test results obtained.

TABLE 1

| Shape of specimen | Number of sheets | Total area in cm.$^2$ | Test Reading | | | | | |
|---|---|---|---|---|---|---|---|---|
| | | | No. 1 | No. 2 | No. 3 | No. 4 | No. 5 | Average |
| Triangular | 2 | 200.0 | 200.5 | 201.3 | 200.4 | 200.3 | 201.4 | 200.2 |
| Irregular | 4 | 200.0 | 202.5 | 202.6 | 202.1 | 201.3 | 202.3 | 202.8 |
| Rectangular | 2 | 200.0 | 199.1 | 201.3 | 200.0 | 200.6 | 200.8 | 200.5 |
| Do | 6 | 200.0 | 196.3 | 202.7 | 197.6 | 196.5 | 199.5 | 199.5 |
| Do | 16 | 200.0 | 197.1 | 198.3 | 198.3 | 200.2 | 201.5 | 199.1 |

Table 2 shows the result of measurements on specimens of different transparency.

TABLE 2

| Total area in cm.$^2$ | Material of specimen paper | No. 1 | No. 2 | No. 3 | Average |
|---|---|---|---|---|---|
| 200.0 | Perfectly opaque | 199.5 | 200.1 | 200.2 | 199.9 |
| | 50% semi-transparent | 201.5 | 200.5 | 201.0 | 200.9 |

As a result of these tests, it has been found that the apparatus according to the invention has a measuring error not exceeding ±1.5% regardless of the shape and size of the specimens and that it can also measure a specimen having transparency variations up to about 50%. The measuring accuracy can be still further increased by altering the width of the slit, the number of radial slits, the number of frequency of reference pulses and the travelling speed of the specimen but the measuring error of ±1.5% as indicated by the above data is ordinarily acceptable in practice.

In accordance with the invention, only one light receiver 12 is provided despite the fact that light is thrown on the whole field to be measured and the light which is received by the light receiver is guided by the rotation of slits and a special reflecting surface 11a rather than by mechanical oscillations. By reason of this construction, the apparatus in accordance with the invention is not materially affected by external light.

A constructional embodiment of apparatus in accordance with the invention is shown by way of example in FIGS. 4 and 5, in which corresponding parts are designated by the same reference numerals as in FIGS. 1, 2 and 3 with the addition of 100. A transparent belt 101 runs on rollers 102, 103, 104 and 105, rotatably supported by side plates 110. The roller 104 is shown adjustable so as to apply proper tension to the belt. An opaque plate 106 disposed just below the upper horizontal run of the belt 101 is provided with an arcuate slit 107. A reflector 108 has a curved face 108a, which receives light from a point source 109 and directs it downwardly as a focused screen of light passing through the arcuate slit 107. The light passing through the slit is received by a reflector 111, having a curved face 111a for directing and focusing the light on a receiver 12 provided with a condensing lens 113.

As in FIGS. 1 to 3, there is provided a pulse generator shown as comprising a perforate disc 115 driven by a motor 119, and a photocell of 118 which receives light passing through holes in the disc 115 from a small light source (not shown).

By means of a suitable belt or chain, (not shown), a pulley 120 on the shaft of the motor 119 drives a pulley 122 on a shaft 122a on the upper end of which there is fixed a disc 123 disposed just below the plate 106. A plurality of radial slits 124 are provided in the disc 123 as seen in FIG. 5. Through a worm gear drive 128, the shaft 122a drives a transverse shaft 129a provided at one end with a pulley or sprocket 130, which by means of a suitable belt or chain 131 drives pulleys or sprockets 132 and 133 provided respectfully on the rollers 102 and 103. The chain or belt 131 is kept tensioned by means of an idler roller 134.

An upper transparent belt 125 runs over rollers 126 and 127, and also smaller rollers 135 and 136. The belt is pressed by a spring pressed roller 136 into driving engagement with the roller 126, which is driven frictionally from roller 102. The apparatus is housed in a suitable casing 140 provided with rubber supporting legs 141. The operation of the apparatus is as described with reference to FIGS. 1 to 3 and 6 to 11.

Thus the apparatus in accordance with the invention, is of simple construction and reliable in its operation. By reason of the intensity of illumination provided by the focusing reflector 8a and the condensing reflector 11a, and by reason of the light receiver 12 and hence the gate 52 being controlled at any one time by the small portion of light passing through the gap H, the apparatus is highly sensitive and capable of measuring the area of translucent bodies such as tracing paper with the same accuracy as opaque bodies.

With the apparatus according to the invention not only irregularly formed specimens can be measured, but also two or more specimens can be introduced into the apparatus in close sequence so as to measure their total area automatically.

The plate 6 with its arcuate slit 7 can, if desired, be omitted since the screen of light through which the specimen passes is defined by the reflecting surface 8a. It is however desirable to use the plate 6 with its arcuate slit 7 in order to define the width and curve of the light screen still more sharply and to shield the condensing reflector 11 from external light.

The number of radial slits in the rotating disc 23 is preferably 3 or more, the interval between successive slits corresponding to the length of the arcuate slit 7. The beam of light L which passes through the gap H defined by the intersection of slits 7 and 24 has a cross sectional area defined by the width of the slits. In the example given above, where the slits 7 and 24 have a width of 1 mm., the light beam L will have a unit cross sectional area of 1 mm.$^2$.

In an alternate embodiment, the plate 23 is enlarged so that the center of rotation of plate 23 coincides with the point O' which is the center of curvature of the arcuate slit 7. This results in a constant cross sectional area for the beam of light L since the radial slits are at all times orthogonal to the arcuate slit 7. However, it has the disadvantage of increasing the overall width of the apparatus.

Although a preferred embodiment of apparatus has been illustrated in the drawings and particularly described, it will be understood that the invention is in no way limited to this embodiment and that numerous changes in details of construction and arrangement may be made without departing from the spirit and scope of the invention.

What we claim is:

1. Automatic area measuring apparatus comprising a transparent belt for transporting an object the area of which is to be measured, means for producing a thin screen of parallel light rays passing through said belt, said screen extending transversely across the belt, means for driving said belt to transport said object progressively through said screen, a rotating opaque plate close to and parallel to said belt and having at least one radially extending slit intersecting said light screen to define a light beam passing through said slit, means for rotating said plate in timed relation to the driving of said belt whereby said light beam travels transversely of said belt as said plate rotates, a light receiver, means for collecting light from said screen passing through said slit and directing it to said light receiver, means for generating sequential pulses at a predetermined rate, means for counting said pulses, gate means connecting said pulse generating means with said counting means to transmit pulses to said counting means when the gate means is open, said gate means being connected with and controlled by said light receiver to close or open said gate means in accordance with whether or not a light beam is received by said receiver, said object when being transported through said light screen intercepting a portion of said screen in accordance with its size and thereby interrupting said light beam during travel of said slit along that portion of said light screen which is intercepted by said object, whereby said gate means is controlled in accordance with the size of said object and the number of pulses counted during said interruptions of said light beam corresponds to the area of said object.

2. Apparatus according to claim 1, in which said means for producing said light screen comprises a point light source and a curved reflector receiving light from said source and directing it toward said transparent belt as a thin screen of generally arcuate shape.

3. Apparatus according to claim 2, in which said collecting means comprises a second curved reflector of like configuration disposed on the opposite side of said transparent belt and directing light from said screen to said receiver.

4. Apparatus according to claim 3, in which said reflectors have a focal length equal to the radius of curvature of said arcuate light screen, said point light source being located at the focus of the first mentioned reflector and said receiver being located at the focus of said second reflector.

5. Apparatus according to claim 2, in which the radius of curvature of said light screen intersecting said belt is greater than the radius of said rotating plate.

6. Apparatus according to claim 4, in which the radial extent of said slit is sufficient for said slit to intersect said screen throughout the travel of said slit along said screen corresponding to the maximum width of an object to be measured.

7. Apparatus according to claim 1, further comprising a stationary opaque plate parallel to and close to said belt and having a slit precisely defining said light screen.

8. Apparatus according to claim 7, in which at least three radial slits are provided in said rotating plate and in which the distance between successive radial slits is equal to the length of said slit in said stationary plate so that for any rotational position of said rotating plate a single radial slit intersects said slit in said stationary plate.

9. Apparatus according to claim 1, in which said pulse generating means comprises a perforate disc having a circumferential series of spaced holes and driven by said driving means, a light source directing light sequentially through said holes as the disc rotates and a photosensitive element receiving light passing through said holes.

10. Apparatus according to claim 1, further comprising a second transparent belt driven by said driving means and having a portion close to said first mentioned belt to hold said object flat against said first mentioned belt.

References Cited

UNITED STATES PATENTS

| | | | |
|---|---|---|---|
| 2,756,627 | 7/1956 | Boycks | 356—158 |
| 3,312,140 | 4/1967 | Dokoupil | 356—158 |

FOREIGN PATENTS 1,035,812    4/1953    France.

RALPH G. NILSON, Primary Examiner

T. N. GRIGSBY, Assistant Examiner

U.S. Cl. X.R.

33—123; 250—224; 356—158, 160